Patented Apr. 22, 1941

2,239,345

UNITED STATES PATENT OFFICE 2,239,345

PROLIFERATION STIMULANTS AND PROCESS OF MAKING SAME

George Sperti, Cincinnati, Ohio, assignor to The Institutum Divi Thomae Foundation, Cincinnati, Ohio, a corporation of Ohio No Drawing. Application June 19, 1939, Serial No. 279,997

10 Claims. (Cl. 167—74)

This invention relates to the extraction from cellular matter of either animal or plant origin of an active fraction or extract having metabolic stimulating properties for cellular matter and more particularly the capacity to stimulate cellular proliferation, although other properties may also be present such as the capacity to stimulate cellular respiration and to promote reactions such as fermentation. This application is a continuation in part of my prior application Serial No. 184,337, filed January 10, 1938.

It is known that when cellular matter such as yeast or malt combings is destroyed by suspension in a toxic medium such as alcohol or by heat, a product is obtained which among other properties has the capacity to stimulate growth or proliferation of living yeast. The composition or constitution of such products, however, and their mode of action, have not been fully understood. In my copending application, Serial No. 280,000, filed June 19, 1939, concurrently herewith, I have disclosed the production from cellular matter of extracts having the capacity to stimulate cellular respiration, these extracts being prepared from the cellular matter by various processes. While these extracts are primarily useful for the stimulation of respiration, some of them nevertheless are found to stimulate also cellular proliferation or growth.

The present invention involves the discovery that if the cells are treated in such a manner as to injure the cells or interfere with their normal life processes and such as to extend such harmful treatment of the cells without destruction thereof for substantial periods of time as distinguished from rapid or immediate destruction, the product produced is both quantitatively and qualitatively different from growth factors produced as disintegration products. The possibility is thereby suggested that the active principle responsible for proliferation-promoting properties is in some way produced or given off as a physiologic response to injury to the life processes of the cells, as distinguished from disintegration products that would be released on destruction of the cells, but whatever may be the true explanation, proliferation-promoting properties which differ both quantitatively and qualitatively have been found to result from the process disclosed and claimed hereinafter.

Living cellular matter of widely varying nature and origin and from both the animal and plant kingdoms can be treated by a process embodying the invention to produce products as described above. For example, good results have been obtained with yeast, rat, mouse and chick embryo, rat spleen and liver, various types of bacteria, etc. For convenience in treating the cellular matter, and also to facilitate the subsequent separation of the active principle from the remaining cellular matter, which is usually desirable but not always necessary, it is preferred with some starting materials, such as yeast, malt combings, and the like, to form a suspension of the cellular matter in a suitable non-toxic or substantially non-toxic liquid such as water, isotonic salt solutions such as Ringer's solution, nutrient media, alcohol in high dilution (of the order of 10% or less), etc. In this form the cells are treated so as to cause injury or harm to their normal life processes but the treatment is regulated so as to prevent rapid destruction of the cells. With other starting materials such as crushed, ground or pulped animal tissue, the pulped material may be treated without suspension, although suspensions may be made if desired.

Suitable forms of treatment comprise mild treatment by heat or radiant energy such as ultra-violet radiation, X-rays, etc., the intensity of the treatment being regulated to prevent instant or substantially instant destruction of the cells. Chemical injuring agents, high frequency agitation or other mild but sustained mechanical injury can also be used. The amount of active material increases as the time of treatment is prolonged. On the other hand, if the treatment is too mild, it may not affect the cells throughout the whole mass under treatment and may therefore require an impracticable length of treatment in order to obtain practical yields. The intensity of the harmful treatment must therefore be correlated with the time required to obtain the desired amount of active substance. It is not necessary to destroy the cells but when conditions are such that the cells are slowly destroyed, an indication of the extent of completion of the process may be obtained by actual count of the dead cells as indicated by staining with methylene blue or by other standard method, because when substantially all of the cells have been destroyed, further treatment has no further effect.

After treatment the material may be centrifuged, filtered or otherwise suitably treated if it is desired to separate the liquid which contains the active principle from the remaining cellular matter. This liquid may then be concentrated, as by distillation, and the concentration may be continued if desired until a substantially solid residue is obtained.

The following examples are illustrative of the process described in general terms above, but are not to be construed as defining the limits of the invention, reference being had to the appended claims for this purpose.

EXAMPLE 1

Suspensions of Fleischmann's bakers' yeast were placed in quartz tubes which were then subjected to ultra-violet irradiation from a quartz mercury arc, the distance of the tubes from the lamp being progressively increased so as to diminish the intensity of the treatment and the irradiation period being correspondingly prolonged until the same amount of killing of the yeast cells (90%) was obtained in each tube. The concentration of each suspension was 2 grams of yeast per 100 cc. of a 0.9% solution of NaCl. After the irradiation was completed, the remaining cellular matter was separated by filtration. The filtrates were tested for growth-promoting properties by adding equal amounts thereof to cultures of yeast growing in Reader's medium in rocker tubes for twenty-four hours at 30° C. After the growth period the yeast crop was determined by a photo-densitometer. The effect of the filtrates was compared with the effects of similar filtrates from non-irradiated controls.

| Time of irradiation, minutes | Distance from lamp in cm. | Yeast crop in mg./cc. | |
|---|---|---|---|
| | | Irradiated | Non-irradiated |
| 20 | 10 | 1.1 | .46 |
| 40 | 17 | 1.3 | .52 |
| 80 | 24 | 1.56 | .4 |
| 160 | 34 | 2.18 | .78 |

EXAMPLE 2

Compressed yeast was suspended in isotonic salt solution in concentrations of 50 and 100 mg. per cc. The suspensions were divided into two portions, one of which was irradiated with full ultra-violet at 25 cm. from a Burdick quartz mercury arc operated at 65 volts. The other was kept as a control suspension at a comparable temperature throughout the period of irradiation. After irradiation, both suspensions were centrifuged or filtered through Büchner filters to remove the yeast, after which they were filtered through Berkefeld filters to free them from any remaining cells. The yields were calculated by taking the filtrates to dryness, weighing the material so obtained, and subtracting the weight of the salt present.

The materials were assayed by adding them to cultures of yeast grown in Reader's medium in rocker tubes for twenty-four hours at 30° C. Each tube contained a total of 25 cc. (including added material) and was seeded with 0.064 mg. per cc. of cultured yeast.

The yeast crops after twenty-four hours were determined by a photoelectric photo-densitometer. Since this measured total protoplasm present rather than number of cells, the data are given in terms of yield on a weight basis (wet weight of yeast in mg. per cc.), rather than in population counts. Microscopic examination of the rocker-tube contents after the growth period showed, however, that the average size of cells was no greater than that in the original inocula (frequently it was less because of the presence of many young cells); hence increased crop weight represented stimulation of proliferation rather than of growth in cell size.

The proliferation-promoting potencies of the samples assayed are expressed in "growth units," this unit being defined as an increased yeast crop after twenty-four hours, corresponding to a count of 25 greater than that in the control tubes (count × 250=cells per cu. mm.). On the weight basis, this corresponded to a concentration of 1.6 mg. per cc. greater than that in the controls. The number of growth units per mg. of material added to each cc. of rocker-tube contents was calculated from curves relating the crop after twenty-four hours to the concentration of added material.

| Preparation | Concentration of suspensions in mg./cc. | Irradiation time in hours | Concentration of filtrate in mg./cc. | Growth units per mg. | Growth units per cc. of filtrate | Growth units per g. of yeast |
|---|---|---|---|---|---|---|
| A | 50 | 1.5 | 3.49 | 1.84 | 6.42 | 128 |
| B | 100 | .7 | 14.3 | 5.0 | 71.5 | 715 |

FILTRATES FROM NON-IRRADIATED CONTROL SUSPENSIONS CORRESPONDING TO ABOVE

| Preparation | Concentration of suspensions in mg./cc. | Irradiation time in hours | Concentration of filtrate in mg./cc. | Growth units per mg. | Growth units per cc. of filtrate | Growth units per g. of yeast |
|---|---|---|---|---|---|---|
| A | 50 | Non-irradiated less than 1% stained | 1.72 | 0.21 | 0.36 | 7.2 |
| B | 100 | Non-irradiated 1 to 2% stained | 0.59 | 1.39 | 0.82 | 8.2 |

In each case the control suspensions stood during the time of irradiation under similar conditions of temperature, etc. The differences in time of irradiation required for 90-100 per cent staining were obtained by varying the depth and concentration of the suspensions irradiated. All suspensions were filtered through Berkefeld filters The per cent of cells killed (stained) at the end of the irradiation period was the same in both instances. While in preparation "B" a suspension of only twice the concentration was used, the yield per cc. of filtrate was approximately four times as great (with twice the amount of starting material) and the potency per mg. of material three times as great. Thus the yield in terms of growth units per gram of yeast in suspension was roughly six times as great in the long irradiation at low rate of injury. That this cannot be accounted for by the longer period of extraction is indicated by a comparison of the yields, in growth units per mg. of yeast, in the control suspensions. The long period of standing resulted in an increase in yield of only about 15 per cent.

EXAMPLE 3

Different methods of harmful treatment may be combined if desired, the selection of the combination depending on conditions in each case. The following example illustrates the combination of prolonged irradiation followed by more severe treatment with heat, and also shows the better results obtained in this way as compared with the more rapid injury resulting from a severe heat treatment followed by prolonged irradiation.

Yeast suspensions were used containing 10 grams of bakers' yeast per 100 cc. isotonic salt solution. One suspension was irradiated four hours and fifteen minutes by a Burdick quartz mercury arc lamp operating at 70 volts, the suspension being placed in a quartz tube at a distance of 15 cm. from the lamp. After this irradiation the suspension was boiled for three minutes. A second suspension was treated in the same manner except that the boiling preceded the irradiation. In both cases the combined treatment resulted in complete killing of all cells.

After treatment the filtrates from the suspensions were taken to dryness, the yield of active material from the first suspension (after subtracting the weight of the salt) being 11.1 mg. per cc. and from the second suspension being 7.91 mg. per cc. The dry active material was then dissolved in distilled water at twice the concentration of the original filtrates. These solutions were tested for stimulation of growth of yeast by the procedure described above. The solutions were added to the rocker tubes in increasing amounts expressed below in terms of sixteenths of 1 cc.:

| Amount of filtrate | Yeast crop after 24 hours in mg./cc. | |
| --- | --- | --- |
| | Irradiated, then boiled | Boiled, then irradiated |
| 1 | .7 | .62 |
| 2 | .9 | .76 |
| 4 | 1.1 | .92 |
| 8 | 1.7 | 1.28 |
| 16 | 2.1 | 1.55 |
| 30 | 2.74 | 1.70 |

Example 4

Yeast suspensions comprising 10 g. of bakers' yeast per 100 cc. isotonic salt solution were placed in tubes which were mounted in an electromagnetic vibrator driven by means of a beat frequency oscillator at a frequency of 60 cycles per second. The treatment was continued for approximately ten hours, after which the suspensions were filtered, taken to dryness, and then made up in solution in distilled water at twice the concentration of the original filtrates. These solutions were then tested for their capacity to stimulate the growth of yeast in rocker tubes according to the procedure described above, and compared at the same time with controls which were not agitated. The results, expressed in growth units as defined in Example 2 above were as follows:

| Sample | Growth units | | Percent increase |
| --- | --- | --- | --- |
| | Agitated | Not agitated | |
| A | 5.41 | 4.88 | 10.86 |
| B | 6.187 | 4.60 | 34.5 |
| C | 6.61 | 5.43 | 21.7 |

Similar results have been obtained with other frequencies, particularly higher frequencies, and with other types of mechanical agitation.

Example 5

A yeast extract was made by the procedure described above, using 10 mg. of yeast per 100 cc. of isotonic salt solution, irradiating with ultraviolet light, filtering and concentrating the filtrate. The yields from this yeast suspension and from a non-irradiated control yeast suspension were respectively 2.88 mg. per cc. and 2.71 mg. per cc. These extracts were compared with corresponding extracts made from *E. coli*, grown in nutrient broth, irradiated in one case but not in the control, filtered and dried. These products were tested on yeast by adding varying amounts to yeast cultures in rocker tubes as described above, the amounts added being expressed below in milligrams of test material per cc. of rocker tube contents. The results were as follows:

Yeast crop after 24 hours in mg. per cc.

| Amount added | Irradiated yeast | Non-irradiated yeast | Irradiated E. coli | Non-irradiated E. coli |
| --- | --- | --- | --- | --- |
| .25 | .17 | .31 | | |
| .30 | | | .78 | .46 |
| .50 | .62 | .21 | | |
| .60 | | | 1.3 | .68 |
| 1.00 | 1.62 | .23 | | |
| 1.20 | | | 2.13 | 1.22 |
| 2.00 | 3.60 | .46 | | |

Example 6

Suspensions of yeast were made in isotonic salt solution at concentrations of either 1.75 or 5 g. per 100 cc. These suspensions were divided into two portions, to one of which sufficient heteroauxin was added to give a concentration of 1 mg. of heteroauxin per cc. Both suspensions were allowed to stand for 24 hours, after which heteroauxin was added to the control suspension in concentration the same as that in the test suspension, and both were centrifuged and the supernatant fluids decanted. These fluids were dried and the dried materials were redissolved in distilled water at a concentration of 30 mg. per cc. (not including the weight of salt). These solutions were then centrifuged to remove any remaining heteroauxin and the supernatant fluids, comparatively free from suspended matter, were used in testing the proliferation-promoting effect. Both the control and test fluids stimulated growth, but the test fluids were considerably more potent on an equal weight basis. As the yield was greater in the test than in the control fluids, averaging three to one, the actual difference in the potencies of the fluids themselves was even more marked than by their relative proliferation-promoting effects on an equal weight basis. These effects were determined by adding varying amounts of the solutions to yeast cultures in rocker tubes according to the procedure described above, the amounts added being expressed below in mg. of the dried materials per cc. of the material in the rocker tubes.

Yeast crop after 24 hours in mg. per cc.

| Amount added | Heteroauxin added to suspension before standing | Heteroauxin added to suspension after standing |
| --- | --- | --- |
| .1 | .225 | .19 |
| .3 | .325 | .25 |
| 1.2 | .78 | .41 |

Example 7

Rat embryos were minced in a grinder and divided into two portions. One portion was suspended in Reader's solution and irradiated with a Sperti quartz mercury arc lamp at a distance of 25 cm. for approximately 30 minutes. The second portion was suspended without irradiation in Reader's medium. The suspensions were then centrifuged, filtered, and taken to dryness, after which the dried materials were made up in distilled water to twice the concentration of the original filtrates. These solutions were then tested by adding them to yeast cultures growing in rocker tubes as described above, the amounts added being expressed below in mg. of the dried material per cc. of the material in the rocker tubes.

*Yeast crop after 24 hours in mg. per cc.*

| Amount added | Irradiated Reader's | Non-irradiated Reader's |
|---|---|---|
| 1.2 | 1.2 | .55 |
| 2.5 | 2.15 | .75 |
| 5.0 | 3.70 | |
| 5.7 | | 1.55 |
| 10.2 | 8.0 | |
| 11.5 | | 2.2 |

By similar methods proliferation-promoting substances can be obtained from various animal tissues, such as chick and mouse embryo, rat spleen, rat liver, beef spleen, etc.

In the foregoing examples, proliferation-promoting properties have been tested on yeast cultures, because this is a convenient and easily practiced method and because it is a method in which the results can be readily determined and expressed in mathematical units. It has also been demonstrated in tissue cultures that these proliferation-promoting substances are capable of stimulating cellular proliferation of animal tissue. In such tests the amount of growth is indicated by the size of the cultured tissue after a growth period. Marked stimulation of proliferation has been observed when fractions from yeast obtained as described above are added to embryo heart, chicken skin, and rat skin growing in tissue cultures. The extent of stimulation in such cases, however, cannot be expressed mathematically. Growth factors from animal tissue such as described in Example 7 have also been tested on tissue cultures with resulting stimulation of proliferation. Also growth factors from yeast and beef spleen have been tested clinically on human skin by incorporation in salves and have shown the same property of stimulating proliferation of epithelial cells.

It will be understood that these products may have other valuable properties than the promotion of proliferation. One is the capacity to stimulate respiration or oxygen absorption. When a small quantity of the yeast extract is added to yeast, for example, it is found that the respiration of the yeast cells is stimulated and the oxygen absorption is increased. Stimulation of respiration of human and animal skin can also be obtained through the use of such products, and hence a product produced by a process using the invention can be embodied in cosmetic preparations such as toilet soaps, lotions and salves or creams.

While the chemical constitution of these growth-promoting factors has not yet been definitely determined, definite indications of their nature have been obtained by chemical tests and studies of ultra-voilet absorption spectra.

Filtrates from both irradiated and non-irradiated yeast suspensions contained nitrogen and phosphorus but not halogens or sulphur (negative lead acetate, nitroprusside and Sullivan reactions before and after sodium fusion). Both contained pentose (Bial test) but apparently not desoxypentoses (Kiliani test). The Thomas β-naphthol test gave a blue ring with both materials and a non-uniform brownish color with the Thomas tryptophane reagent. Negligible reducing activity was shown with Benedict's solution, and substantial freedom from protein by the biuret test. Both materials gave positive murexide, Kossel, and diazo, and negative Weidel and Wheeler-Johnston tests. The positive reactions were more marked with the filtrates from irradiated suspensions. Slight turbidity or opalescence was obtained from phosphotungstic, picric, and metaphosphoric acids. No precipitate formed with HgCl₂. No positive color reactions could be obtained for pyridine even after boiling. The active materials gave pH values of about 5.5 (glass electrode) in concentrations of 0.5 to 1.5 mg. per cc. Their activity was not reduced by autoclaving at 20 lb. for 15 minutes.

Biological tests also show the difference between these factors and nucleic acids since both yeast nucleic and thymus nucleic acid are biologically inactive.

These chemical tests show that the growth-promoting factors are not nucleic acids, but ultra-violet absorption spectra show these factors to be related or similar to nucleic acids.

The spectrum of the factor from injured cells (obtained by photographing the spectrum of the filtrate from irradiated yeast with filtrate from non-irradiated yeast in the comparison cell and also the spectrum of the filtrate from irradiated rat liver) is characterized by a marked maximum at 2600 A. and a minimum at 2360 A., similar to the spectra of nucleic acids and their derivatives. On irradiation of the filtrate from injured cells, the extinction at 2600 A. decreases and that at 2360 A. and on the long-wave leg of the curve increases, as in adenine, guanine, etc. Of absorbing components of nucleic acids, the spectrum least resembles that of uracil or cytosine, but bears a resemblance to guanine in the broadness of the curve and to adenine in the 2600 A. maximum.

These factors are shown by biological tests to be distinguished from the following substances present in yeast, all of which are biologically inactive: Vitamins B₁ and B₂ (thiamin and riboflavin), inositol, cystine, l-tryptophane, dl-x-alanine, arginine and tyrosine. The spectrum of these factors is also markedly different from that of vitamin B₁ and lacks the long-wave maximum of vitamin B₂. These factors are also distinguished from nicotinic acid which fails to show stimulation growth of yeast.

With growth factors obtained by prolonged injury in accordance with the above process, biological activity is correlated with absorption at 2600 A. No such correlation is obtained, however, with the so-called "bios".

Products such as described above which will stimulate and increase the rate of proliferation of growing yeast may be used to promote fermentation and similar reactions. Further, certain of these products have been found to stimulate and promote proliferation of human and animal skin and hence are valuable healing agents in topical remedies for cuts, burns, and various skin disorders.

It is to be understood that the foregoing examples are illustrative only and not limitative, as other types of starting materials and other forms of harmful treatment may be employed. It is preferred for practical reasons to subject the cellular matter to an external treatment to cause the injury to the cells, but it will be understood that if the cells are allowed to stand for long periods under conditions which are not ideal, as for example in a mildly toxic medium or at unfavorable temperatures, some injury will be caused and some growth factor will be produced. The references above and in the appended claims to injury are to be understood to include treatment where the cellular matter is held under conditions sufficiently unfavorable as to produce useful quantities of the growth factor within practicable time limits.

What is claimed is:

1. The process of producing a substance capable of stimulating cellular metabolism which comprises subjecting living cells to treatment capable of destroying cellular life when applied in lethal dosage but limiting the intensity of said treatment to prevent immediate destruction of cells and continuing said treatment to cause the production of said substance by the living cells in response to said treatment, whereby the yield of said substance increases up to the point where substantially all the cells are destroyed, and extracting the water-soluble constituents of the treated cells.

2. The process of producing a substance capable of stimulating cellular metabolism which comprises subjecting living cells in suspension in a substantially non-toxic medium to treatment capable of destroying cellular life when applied in lethal dosage but limiting the intensity of the treatment to prevent immediate destruction of cells and continuing said treatment to cause the production of said substance by the living cell in response to said treatment, whereby the yield of said substance increases up to the point where substantially all the cells are destroyed, and removing the solid matter from the suspension to obtain a cell-free liquid containing said substance.

3. The process of producing a substance capable of stimulating cellular metabolism which comprises subjecting living cells in suspension in a substantially non-toxic medium to treatment capable of destroying cellular life when applied in lethal dosage but limiting the intensity of the treatment to prevent immediate destruction of cells and continuing said treatment to cause the production of said substance by the living cell in response to said treatment, whereby the yield of said substance increases up to the point where substantially all the cells are destroyed, and removing the solid matter from the suspension to obtain a cell-free liquid containing said substance and concentrating said liquid to recover said substance in solid form.

4. The process of producing a substance capable of stimulating cellular metabolism which comprises irradiating living cells with ultraviolet light while limiting the intensity of the radiation to prevent immediate destruction of cells and continuing the irradiation to cause the production of said substance by the living cells in response to the irradiation, whereby the yield of said substance increases up to the point where substantially all the cells are destroyed, and extracting the water-soluble constituents of the irradiated cells.

5. The process of producing a substance capable of stimulating cellular metabolism which comprises subjecting living cells in suspension in a substantially non-toxic medium to irradiation with ultraviolet light while limiting the intensity of the radiation to prevent immediate destruction of cells and continuing the irradiation to cause the production of said substance by the living cells in response to the irradiation, whereby the yield of said substance increases up to the point where substantially all the cells are destroyed, and removing the solid matter from the suspension to obtain a cell-free liquid containing said substance.

6. The process of producing a substance capable of stimulating cellular metabolism which comprises subjecting living yeast cells to treatment capable of destroying cellular life when applied in lethal dosage but limiting the intensity of said treatment to prevent immediate destruction of cells and continuing said treatment to cause the production of said substance by the living cells in response to said treatment, whereby the yield of said substance increases up to the point where substantially all the cells are destroyed, and extracting the water-soluble constituents of the treated cells.

7. The process of producing a substance capable of stimulating cellular metabolism which comprises subjecting living yeast cells in suspension in a substantially non-toxic medium to irradiation with ultraviolet light while limiting the intensity of the radiation to prevent immediate destruction of cells and continuing the irradiation to cause the production of said substance by the living cells in response to the irradiation, whereby the yield of said substance increases up to the point where substantially all the cells are destroyed, and removing the solid matter from the suspension to obtain a cell-free liquid containing said substance.

8. The process of producing a substance capable of stimulating cellular metabolism which comprises subjecting living liver cells in suspension in a substantially non-toxic medium to treatment capable of destroying cellular life when applied in lethal dosage but limiting the intensity of the treatment to prevent immediate destruction of cells and continuing said treatment to cause the production of said substance by the living cell in response to said treatment, whereby the yield of said substance increases up to the point where substantially all the cells are destroyed, and removing the solid matter from the suspension to obtain a cell-free liquid containing said substance.

9. A stimulant for cellular metabolism produced by the process defined in claim 1.

10. A stimulant for cellular metabolism produced by the process defined in claim 2.

GEORGE SPERTI.